No. 623,962. Patented May 2, 1899.
C. O. ANDERSON.
BICYCLE PROPULSION.
(Application filed Aug. 25, 1898.)
(No Model.)
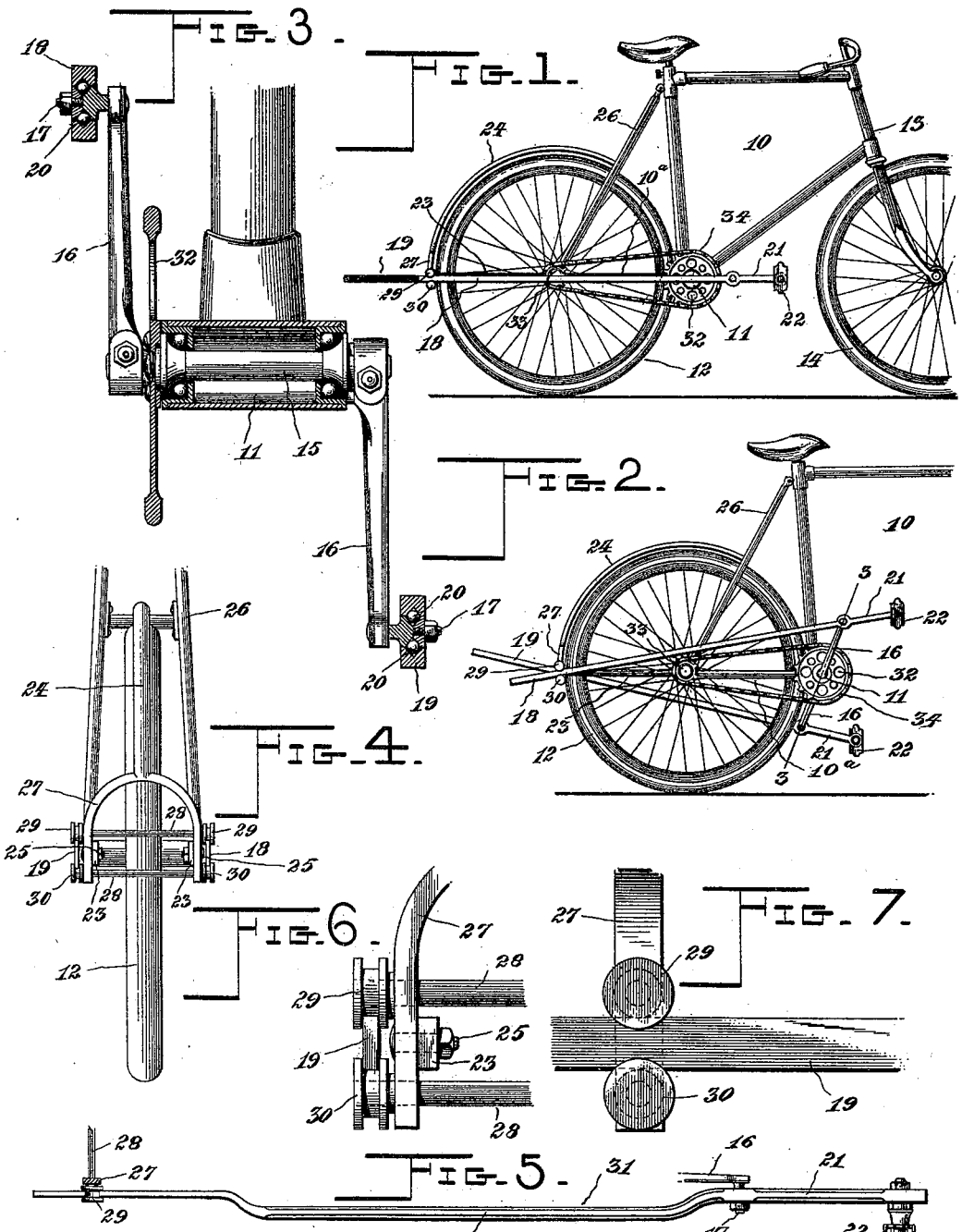
Witnesses
Charles O. Anderson, Inventor,
By his Attorneys,

# UNITED STATES PATENT OFFICE.

CHARLES O. ANDERSON, OF BUTTE, MONTANA, ASSIGNOR OF ONE-FOURTH TO NEIL ALLAN MACDONALD, OF SAME PLACE.

BICYCLE PROPULSION.

SPECIFICATION forming part of Letters Patent No. 623,962, dated May 2, 1899.

Application filed August 25, 1898. Serial No. 689,493. (No model.)

*To all whom it may concern:*

Be it known that I, CHARLES O. ANDERSON, a citizen of the United States, residing at Butte, in the county of Silver Bow and State of Montana, have invented a new and useful Bicycle Propulsion, of which the following is a specification.

My invention relates to propelling mechanism for bicycles; and the object is to provide a mechanism which multiplies the power exerted by the rider for the propulsion of the machine.

A further object of the invention is to reduce the wheel-base of the machine by bringing the crank-hanger and rear wheel in close relation, so that the elements of the propelling mechanism may be proportioned to secure the increased leverage and retain the arrangement of the pedal-cranks at all times within reach of the rider.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a side elevation of a bicycle equipped with my improvement and showing the treadle-levers and pedals in the same horizontal plane. Fig. 2 is a similar view with the levers and the pedals in the positions they assume when the pedals shall have traveled a fragment of a circle. Fig. 3 is a vertical transverse section through the crank-hanger and crank-shaft on the plane indicated by the dotted line 3 3 of Fig. 2. Fig. 4 is a rear end elevation. Fig. 5 is a plan view of one of the propelling-levers. Figs. 6 and 7 are enlarged detail views, in rear and side elevation, respectively, of the shiftable fulcrum for one of the levers.

Like numerals of reference denote like and corresponding parts in each of the several figures of the drawings.

The frame 10 of the bicycle embodying my invention is similar to ordinary diamond-frame bicycles of the safety pattern, and it is equipped with a crank-hanger 11, a rear wheel 12, the fork 13, and the front wheel 14. The horizontal frame-fork 10$^a$ is extended beyond the bearing provided for the axle of the rear wheel, and the rear extremity of this frame-fork is united or coupled to a hanger-bar, presently referred to, for the purpose of providing a strong rigid support for the shiftable fulcrum-rollers of the propelling-levers, as will hereinafter more fully appear.

In constructing the frame of the bicycle I propose to arrange the crank-hanger 11 in such close relation to the tread of the rear wheel that sufficient space is provided for clearance of the wheel, and in practice it is designed that the face of the crank-hanger shall be within one-half inch of the tread of the wheel instead of providing a space of five or six inches between the crank-hanger and wheel, as in ordinary machines, thus reducing the wheel-base.

The crank-shaft 15 is journaled in the usual ball-bearings provided within the crank-hanger, and the ends of this shaft have the radial crank-arms 16, which extend in diametrically opposite directions from the crank-shaft. The free ends of the crank-arms have wrist-pins 17, which are connected with the propelling-levers 18 19, the latter being disposed or arranged on opposite sides of the machine in compact relation to the frame and rear wheel thereof. To provide for the proper connection of the wrist-pins to the levers and reduce the friction and wear on the parts as much as possible, I provide the propelling-levers with ball-bearings 20, which are secured or arranged on said levers at points about five and one-half inches from the front extremities thereof, although this exact proportion is not essential. The ball-bearings 20 receive the wrist-pins 17 of the crank-arms, and the lever and its appropriate crank-arm are thus connected directly together, so that the motion of each lever will be communicated by the crank to the crank-shaft. Instead of attaching the pedal directly to the crank of the pedal-shaft, as is usual in ordinary safety-bicycles, I apply the pedals 22 to the short arms 21, which are provided by the front ends of the levers extending beyond the ball-bearings 20 and wrist-pins 17, and each crank of the shaft is thus increased in length by the short arms 21 of the levers.

The rear frame-fork 10ᵃ is extended or carried backward, as at 23, rearward from the axle of the hind wheel 12, and this extension of the frame-fork is joined, as at 25, to the hanger-bar 24. The hanger-bar is arched to lie over the rear wheel 12, and the front end thereof is firmly united to the upwardly-inclined brace 26, that extends from the rear-wheel hub and frame-fork 10ᵃ to the seat-post tube, the hanger-bar 24 being secured in a suitable way to this frame-brace at a point below the saddle. The rear end of the hanger-bar is forked or bifurcated at 27 to be properly united with the rear terminals of the frame-fork 10ᵃ, and the horizontal shafts or arbors 28 are passed through the joint 25 between the frame-fork and the bifurcated end of the hanger-bar. These shafts or arbors are supported by the hanger-bar one above the other in the same vertical plane, so as to occupy the same position relatively to the frame at all times, and the ends of the shafts or arbors are extended or prolonged beyond the bifurcated hanger-bar for the proper application thereto of the two pairs of fulcrum-rolls, between which the rear ends of the propelling-levers are slidably supported. The fulcrum-rolls for each of the propelling-levers are indicated more clearly in Figs. 6 and 7 by the numerals 29 30. The fulcrum-rolls are mounted on the protruding portions of the shafts or arbors 28, so as to rotate freely, and in the peripheral working faces of these rolls are formed coincident grooves that receive or accommodate the rear ends of the propelling-levers. The levers are fitted in the grooved rolls to be capable of a limited oscillating movement in vertical planes and also of a sliding movement in a horizontal plane, and the levers are retained or held in place by the grooved rolls, which permit the described oscillating and sliding play thereto. Each lever is thus mounted in the rolls to travel with its crank-arm in the orbital path described by the arm in its revolution with the shaft, and the rolls thus serve as a shiftable fulcrum for the lever, which accommodates itself to the changing positions of the crank-arm.

Each propelling-lever is curved or offset at a point intermediate of its length, as at 31, (see Fig. 5,) to permit the lever to have sufficient clearance with relation to the frame and the wheel-hub to avoid the lever striking the frame as it travels with the crank-arm.

A driving-sprocket 32 is secured to the crank-shaft, a driven sprocket 33 is fixed to the rear-wheel hub, and an endless sprocket-chain 34 is employed to operatively connect the crank-shaft with the rear-wheel hub. This transmitting mechanism is familiar to those skilled in the art; but I do not desire to be restricted to this particular mechanism in the construction of the bicycle.

The power of the rider is applied to the pedals to rotate the crank-arms and the crank-shaft, and the motion of the shaft is transmitted through the gearing to the rear wheel, thus propelling the machine. As is usual in the art, when one crank is on the upstroke the other crank is on the downstroke. As one crank moves forwardly and downwardly under the effort of the rider the lever attached to said crank is drawn in a forward direction to travel with the crank, and this lever slides between its fulcrum-rolls at the same time that it is rocked or turned in pursuing the course described by its connection with the crank. When one crank reaches the limit of its downward movement, the other crank is brought into position for the rider to apply pressure to the other lever, and thus the cranks present the levers and their pedals in position for the rider to advantageously apply power to the levers for the continued propulsion of the machine, said levers reciprocating in opposite directions alternately in unison with the travel of the cranks.

The employment of long levers with pedals at their front ends and each fulcrumed at its rear end to shift or slide as the pedals travel in their orbits supplements the leverage obtained by the cranks on the shaft, and the gear being thus increased by the multiplication of the leverage the machine may be propelled at high speed by the efforts of the rider.

Changes may be made in the form of some of the parts while their essential features are retained and the spirit of the invention embodied. Hence I do not desire to be limited to the precise form of all the parts as shown, reserving the right to vary therefrom.

Having thus described the invention, what I claim is—

In a bicycle, a frame having its horizontal rear fork extended beyond the rear-wheel hub, the upright rear fork, and an arched hanger-bar united firmly to the upright rear fork and having its rear end forked, said forked end of the hanger-bar having its members extending across and united firmly to the extended rear ends of the horizontal fork, combined with pairs of rolls journaled on the branches of said forked end of the hanger-bar, levers each slidably confined between a pair of the rolls, and a driving crank-shaft connected to the levers, substantially as described.

In testimony that I claim the foregoing as my own I have hereto affixed my signature in the presence of two witnesses.

CHARLES O. ANDERSON.

Witnesses:
  JNO. H. LYNCH,
  FRED HAVARD.